United States Patent
Ooms et al.

(10) Patent No.: US 6,953,765 B2
(45) Date of Patent: *Oct. 11, 2005

(54) DOUBLE METAL CYANIDE CATALYSTS FOR PREPARING POLYETHER POLYOLS

(75) Inventors: Pieter Ooms, Krefeld (DE); Jörg Hofmann, Krefeld (DE); Walter Schäfer, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 525 days.

This patent is subject to a terminal disclaimer.

(21) Appl. No.: 10/138,209

(22) Filed: May 3, 2002

(65) Prior Publication Data

US 2002/0198099 A1 Dec. 26, 2002

(30) Foreign Application Priority Data

May 7, 2001 (DE) .......................... 101 22 020

(51) Int. Cl.$^7$ .................. B01J 31/00; B01J 27/26
(52) U.S. Cl. .................. 502/175; 502/159; 502/162; 502/167; 502/170; 502/172
(58) Field of Search .................. 502/175, 159, 502/162, 170, 172, 167

(56) References Cited

U.S. PATENT DOCUMENTS

| 3,404,109 A | 10/1968 | Milgrom | |
|---|---|---|---|
| 3,829,505 A | 8/1974 | Herold | |
| 3,941,849 A | 3/1976 | Herold | |
| 5,158,922 A | 10/1992 | Hinney et al. | 502/175 |
| 5,470,813 A | 11/1995 | Le-Khac | 502/175 |
| 5,693,584 A | 12/1997 | Le-Khac | 502/159 |
| 6,063,897 A | 5/2000 | Le-Khac et al. | 528/410 |
| 6,204,357 B1 | 3/2001 | Ooms et al. | 528/409 |
| 6,376,420 B1 | 4/2002 | Ooms et al. | 502/175 |

FOREIGN PATENT DOCUMENTS

| DE | 198 42 383 | 3/2000 |
|---|---|---|
| DE | 199 24 672 | 11/2000 |
| EP | 0 700 949 | 3/1999 |
| EP | 0 761 788 | 10/1999 |
| JP | 4-145123 | 5/1992 |
| WO | 97/40086 | 10/1997 |
| WO | 99/59719 | 11/1999 |

*Primary Examiner*—Elizabeth D. Wood
(74) *Attorney, Agent, or Firm*—Joseph C. Cil; John E. Mrozinski, Jr.

(57) ABSTRACT

The invention is directed to a double-metal cyanide catalyst for the preparation of a polyether polyol by the polyaddition of an alkylene oxideon to a starter compound containing active hydrogen atoms, wherein the DMC catalyst comprises a) at least one double-metal cyanide compound; b) at least one organic complexing ligand; and c) two different complexing components.

8 Claims, No Drawings

DOUBLE METAL CYANIDE CATALYSTS FOR PREPARING POLYETHER POLYOLS

TECHNICAL FIELD OF THE INVENTION

The invention is directed to novel double metal cyanide ("DMC") catalysts, to a process for the preparation of these novel DMC catalysts and to a process for preparing a polyether polyol by the polyaddition of an alkylene oxide to a starter compound containing active hydrogen atoms, and to the polyetherpolyols produced by the process.

BACKGROUND OF THE INVENTION

DMC catalysts for the polyaddition of alkylene oxides to starter compounds containing active hydrogen atoms are known. See, for example, U.S. Pat. Nos. 3,404,109, 3,829,505, 3,941,849 and 5,158,922. The use of these DMC catalysts for the preparation of polyether polyols reduces the content of mono-functional polyethers with terminal double bonds, the so-called "mono-ols", in comparison to the preparation of polyether polyols with alkali catalysts, such as alkali metal hydroxides.

Polyether polyols produced by DMC catalysis can be used to process high-quality polyurethanes (e.g. elastomers, foams and coatings). DMC catalysts are usually obtained by reacting an aqueous solution of a metal salt with an aqueous solution of a metal cyanide salt in the presence of an organic complexing ligand, e.g., an ether. In a typical DMC catalyst preparation, aqueous solutions of zinc chloride (in excess) and potassium hexacyanocobaltate are mixed to form a dispersion. Dimethoxyethane (glyme) is then added to the dispersion. After filtering and washing the dispersion with the aqueous glyme solution, an active catalyst of the general formula

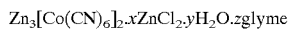

$$Zn_3[Co(CN)_6]_2 \cdot xZnCl_2 \cdot yH_2O \cdot z\text{glyme}$$

is obtained. See, for example, EP 700 949.

The following references disclose DMC catalysts which use tert-butanol as the organic complexing ligand (by itself or in combination with a polyether) in the preparation of polyether polyols to further reduce the content of mono-functional polyethers with terminal double bonds: JP 4145123; U.S. Pat. No. 5,470,813; EP 700 949; EP 743 093; EP 761 708; and WO 97/40086. Additionally, the use of these DMC catalysts reduces the induction time in the polyaddition reaction of alkylene oxides with corresponding starter compounds. Catalyst activity also increases. By shortening alkoxylation times, the process of preparing polyether polyols becomes more cost effective. Additionally, due to their increased activity, DMC catalysts can be used in low concentrations (25 ppm or less), making the expensive process of removing catalysts from polyether polyols no longer necessary.

SUMMARY OF THE INVENTION

The object of the present invention is to provide improved DMC catalyst for producing a polyether polyol by the polyaddition of an alkylene oxide on to a starter compound. The DMC catalyst of the present invention has increased catalyst activity compared to known DMC catalysts.

DETAILED DESCRIPTION OF THE INVENTION

The object of the present invention is accomplished by providing a DMC catalyst comprising: a) at least one DMC compound; b) at least one organic complexing ligand which is not a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), a oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface- or interface-active compound; and c) two different complexing components, each complexing component independently comprising a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone co-acrylic acid), a polyvinyl methyl ketone, a poly(4-vinylphenol), a poly(acrylic acid-co-styrene), a oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface- or interface-active compound.

The DMC catalysts of the present invention can optionally comprise water, preferably in an amount from 1 to 10 wt. %, related to the total weight of the resultant DMC catalyst. Also, the DMC catalysts of the present invention can optionally comprise one or more water-soluble metal salts, preferably in an amount from 5 to 25 wt. %, related to the total weight of the resultant DMC catalyst.

The DMC compound a) is the reaction product of a water-soluble metal salt and a water-soluble metal cyanide salt. A water-soluble metal salt suitable for the preparation of the DMC compound a) is represented by the formula (I)

$$M(X)_n \qquad (I)$$

wherein

M is selected from Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), (preferably, Zn(II), Fe(II), Co(II) and Ni(II));

each X is identical or different, preferably identical, and an anion, selected from halides, hydroxides, sulfates, carbonates, cyanates, thiocyanates, isocyanates, isothiocyanates, carboxylates, oxalates and nitrates; and n is 1, 2 or 3.

Examples of suitable water-soluble metal salts useful in the present invention are zinc chloride, zinc bromide, zinc acetate, zinc acetylacetonate, zinc benzoate, zinc nitrate, iron(II) sulfate, iron(II) bromide, iron(II) chloride, cobalt(II) chloride cobalt(II) thiocyanate, nickel(II) chloride, nickel(II) nitrate and mixtures thereof.

A water-soluble metal cyanide salt suitable for the preparation of the DMC compound a) is represented by the formula (II)

wherein
- M' is selected from Fe(II), Fe(III), Co(II), Co(III), Cr(II), Cr(III), Mn(II), Mn(III), Ir(III), Ni(II), Rh(III), Ru(II), V(IV) and V(V), (Co(II), Co(III), Fe(II), Fe(III), Cr(III), Ir(III) and Ni(II) are preferred) and the water-soluble metal cyanide salt can comprise one or more of these metals;
- each Y is identical or different, preferably identical, and is chosen from the group consisting of alkali metal ions and alkaline earth metal ions;
- A is identical or different, preferably identical, and is chosen from halides, hydroxides, sulfates, carbonates, cyanates, thiocyanates, isocyanates, isothiocyanates, carboxylates, oxalates and nitrates; and
- a, and b and c are integers, with the values for a, b and c being chosen so that electroneutrality of the metal cyanide salt is achieved (a is preferably 1, 2, 3 or 4; b is preferably 4, 5 or 6; and c preferably has the value 0).

Examples of water-soluble metal cyanide salts useful in the present invention are potassium hexacyanocobaltate(III), potassium hexacyanoferrate(II), potassium hexacyanoferrate(III), calcium hexacyanocobaltate(III) and lithium hexacyanocobaltate(III).

A preferred DMC compound a) according to the invention is a compound represented by the formula (III)

wherein
- M is as defined in formula (I);
- M' is as defined in formula (II); and
- x, x', y and z are integers and are chosen such that electroneutrality of the DMC compound exists.

Preferably,
- x 3,x'1, y=6 and z=2';
- M=Zn(II), Fe(II), Co(II) or Ni(II); and
- M'=Co(III), Fe(III), Cr(III) or Ir(III).

Examples of suitable DMC compounds a) useful in the present invention are zinc hexacyanocobaltate(III), zinc hexacyanoiridate(III), zinc hexacyanoferrate(III) and cobalt (II) hexacyanocobaltate(III). Further examples of suitable DMC compounds a) are found in U.S. Pat. No. 5,158,922. Zinc hexacyanocobaltate(II) is the preferred DMC compound useful in the present invention.

Organic complexing ligands b) useful in the present invention are known and described in the following references: U.S. Pat. No. 5,158,922, U.S. Pat. No. 3,404,109, U.S. Pat. No. 3,829,505, U.S. Pat. No. 3,941,849, EP 700 949, EP 761 708, JP 4145123, U.S. Pat. No. 5,470,813, EP 743 093 and WO 97/40086. Organic complexing ligands useful in the present invention are water-soluble organic compounds with heteroatoms, such as oxygen, nitrogen, phosphorus or sulfur, which can form complexes with the DMC compound a).

Suitable organic complexing ligands useful in the present invention, but are not limited to, are alcohols, aldehydes, ketones, ethers, esters, amides, ureas, nitrites, sulfides and mixtures thereof. Preferred organic complexing ligands are water-soluble aliphatic alcohols, such as ethanol, isopropanol, n-butanol, iso-butanol, sec-butanol or tert-butanol. Tert-butanol is particularly preferred.

The organic complexing ligand b) is added either during the preparation of the DMC catalyst or directly after the precipitation of the DMC compound a). The organic complexing ligand b) is usually used in excess.

The DMC compound a) is present in amount from about 20 to about 90 wt. %, preferably 25 to 80 wt. %, based on the total weight of the DMC catalyst. The organic complexing ligand b) is present in an amount from about 0.5 to about 30 wt. %, preferably 1 to 25 wt. %, based on the total weight of the DMC catalyst. The DMC catalyst according to the invention preferably comprises from about 1 to about 80 wt %, preferably 1 to 40 wt. %, based on the total weight of the DMC catalyst, of a mixture of the complexing components c).

Complexing components c) suitable for the preparation of the catalysts according to the present invention include glycidyl ethers, glycosides, carboxylic acid esters of polyhydric alcohols, bile acids or salts, esters or amides thereof, cyclodextrins, phosphorus compounds, α,β-unsaturated carboxylic acid esters and ionic surface or interface-active compounds.

Functionalized polymers suitable as component c) for the preparation of the catalysts according to the present invention are known in and described in EP 700 949, WO 97/40086, WO 98/16310 and in German Patent Applications Nos. 197 45 120.9, 197 57 574.9, 198 10 269.0, 198 34 573.9 and 198 42 382.9 as well as in U.S. Pat. No. 6,291, 388. Suitable functionalized polymers include polyethers, polyesters, polycarbonates, polyalkylene glycol sorbitan esters, polyalkylene glycol glycidyl ethers, polyacrylamides, poly(acrylamide-co-acrylic acids), polyacrylic acids, poly (acrylic acid-co-maleic acids), polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, poly(N-vinylpyrrolidone-co-acrylic acids), polyvinyl methyl ketones, poly(4-vinylphenols), poly(acrylic acid co-styrenes), oxazoline polymers, polyalkyleneimines, maleic acids and maleic anhydride copolymers, hydroxyethylcelluloses and polyacetals.

Functionalized polymers preferably used are polyethers, polyesters, polycarbonates, polyalkylene glycol sorbitan esters and polyalkylene glycol glycidyl ethers.

Polyethers which are used in component c) are polyether polyols with hydroxy functionalities of 1 to 8, preferably, 1 to 3, and number-average molecular weights between 150 and $10^7$, preferably, between 200 and 5 $10^4$. Polyethers used in the present invention are typically obtained by ring-opening polymerization of epoxides in the presence of corresponding starter compounds containing active hydrogen atoms under basic, acid or co-ordinative catalysis (for example, DMC catalysis).

Suitable polyether polyols used in the present invention include poly(oxypropylene)polyols, poly(oxyethylene) polyols, EO-primed poly(oxypropylene)polyols, mixed EO/PO-polyols, butylene oxide polymers, butylene oxide copolymers with ethylene oxide and/or propylene oxide and poly(oxytetramethylene) glycols.

Polyesters which are preferably used in component c) include linear and partly branched polyesters which have hydroxyl end groups and average molecular weights below 10,000. These polyesters are described in more detail in German Patent Application No. 197 45 120.9. Polyesters with average molecular weights of 400 to 6,000 and OH numbers of 28 to 300 mg KOH/g, which are suitable for the preparation of polyurethanes, are preferably used in the present invention. Examples of suitable polyesters include poly(ethylene glycol adipates), poly(diethylene glycol adipates), poly(dipropylene glycol adipates), poly (diethylene glycol adipates) branched with trimethylolpropane, poly(tetramethylene glycol adipates) and poly(2-methyl-1,3-propylene glutarates).

Polycarbonates which are preferably used in component c) include aliphatic polycarbonates which have hydroxyl end groups and average molecular weights below 12,000. These polycarbontes are described in more detail in German Patent Application No. 197 57 574.9. Aliphatic polycarbonate-diols with average molecular weights of 400 to 6,000 are preferably used in the present invention. Examples of suitable polycarbonate-diols include poly(1,6-hexanediol)-carbonates, poly(diethylene glycol)-carbonates, poly(dipropylene glycol)-carbonates, poly(triethylene glycol)-carbonates, poly(1,4-ishydroxymethylcyclohexane)-carbonates, poly(1,4-butanediol)-carbonates and poly(tripropylene glycol)-carbonates.

Polyalkylene glycol sorbitan esters which are preferably used in component c) include polyethylene glycol sorbitan esters (polysorbates). These polyalkylene glycol sorbitan esters are described in more detail in EP 1 115 489 (WO 00/15336), the teaching of which are incorporated by reference. Polyethylene glycol sorbitan mono-, di- and triesters of fatty acids having 6 to 18 C atoms and 2 to 40 mol of ethylene oxide are preferably used in the present invention.

Polyalkylene glycol glycidyl ethers which are preferably used in component c) include mono- and diglycidyl ethers of polypropylene glycol and polyethylene glycol. These polyalkylene glycol glycidyl ethers are described in more detail in German Patent Application No. 198 34 573.9.

Glycidyl ethers of monomeric or polymeric (having at least two monomer units) aliphatic, aromatic or araliphatic, mono-, di-, tri-, tetra- or polyfunctional alcohols are preferably used in component c).

Glycidyl ethers of mono-, di-, tri-, tetra- or polyfunctional aliphatic alcohols, for example, butanol, hexanol, octanol, decanol, dodecanol, tetradecanol, ethanediol, 1,2-propanediol, 1,3-propanediol, 1,4-butanediol, 2,2-dimethyl-1,3-propanediol, 1,2,3-propanetriol, 1,6-hexanediol, 1,1,1-tris(hydroxymethyl)ethane, 1,1,1-tris(hydroxymethyl) propane, tetrakis(hydroxymethyl)methane, sorbitol, polyethylene glycol and polypropylene glycol are preferred. Both mono-, di-, tri- and tetra- and polyethers are also useful in the present invention.

Mono- or diglycidyl ethers of butanol, hexanol, octanol, decanol, dodecanol, tetradecanol, ethanediol and 1,4-butanediol as well as polypropylene glycol and polyethylene glycol, preferably with degrees of polymerization of 2 to 1,000 monomer units, are preferably used in the present invention.

Glycidyl ethers useful in the present invention are typically obtained by reacting mono-, di-, tri-, tetra- or polyfunctional alcohols with epichlorohydrin in the presence of a Lewis acid, such as, for example, tin tetrachloride or boron trifluoride, to give the corresponding chlorohydrins, and then dehydrohalogenation with a base (for example, hydroxide).

Methods for preparing glycidyl ethers are known and are described in *Kirk-Othmer, Encyclopedia of Chemical Technology*, Vol. 9, 4th Ed., 1994, p. 739 et seq.; and in *Ullmann, Encyclopedia of Industrial Chemistry*, Vol. A9, 5th Ed., Weinheim/New York, 1987, p. 552.

Glycidyl ethers used in the present invention can be present in the finished catalyst in the form originally employed or in a chemically modified, e.g. hydrolyzed, form.

Suitable glycosides for component c) are compounds built up from carbohydrates (sugars) and non-sugars (aglycones), in which the aglycone is bonded by an oxygen atom via a glycosidic bond with a hemi-acetal C atom of the carbohydrate to give the complete acetal.

Monosaccharides, such as glucose, galactose, mannose, fructose, arabinose, xylose and ribose, disaccharides, such as sucrose and maltose, and oligo- and polysaccharides, such as starch, can be used as the sugar component.

$C_1$–$C_{30}$-hydrocarbon radicals, such as aryl, aralkyl and alkyl radicals, preferably, aralkyl and alkyl radicals, more preferably, alkyl radicals having 1 to 30 C atoms, can be used as the non-sugar component.

Glycosides which are preferably used are the alkyl polyglycosides, which are typically obtained by reacting carbohydrates with alcohols, such as methanol, ethanol, propanol and butanol, or by transacetalization of short-chain alkyl glycosides with fatty alcohols having 8 to 20 C atoms in the presence of acids.

Alkyl polyglycosides with glucose as the recurring unit in the chain, with alkyl chain lengths of $C_8$ to $C_{16}$ and average degrees of polymerization of between 1 and 2 are preferred.

Methods for preparing glycosides are known and are described in *Kirk-Othmer, Encyclopedia of Chemical Technology*, Vol. 4, 4th Ed., 1992, page 916 et seq.; in *Römpp, Lexikon Chemie, Römpp's Chemical Dictionary*, Vol. 2, 10th Ed., Stuttgart/New York, 1996, p. 1581 et seq.; and in *Angewandte Chemie* 110, p. 1394–1412 (1998).

Suitable carboxylic acid esters of polyhydric alcohols useful for component c) include esters of $C_2$–$C_{30}$-carboxylic acids with aliphatic or alicyclic alcohols with two or more hydroxyl groups per molecule, such as ethylene glycol, 1,2-propanediol, 1,3-propanediol, diethylene glycol, triethylene glycol, 1,2,3-propanetriol (glycerol), 1,3-butanediol, 1,4-butanediol, butanetriol, 1,6-hexanediol, 1,1,1-trimethylolethane, 1,1,1-trimethylol-propane, pentaerythritol, carbohydrates (sugars) and sugar alcohols, such as sorbitol and sorbitan. Suitable sugars are monosaccharides, such as glucose, galactose, mannose, fructose, arabinose, xylose and ribose, disaccharides, such as sucrose and maltose, and oligo- and polysaccharides, such as starch.

$C_2$–$C_{30}$-carboxylic acids, such as aryl-, aralkyl- and alkylcarboxylic acids, preferably, aralkyl- and alkylcarboxylic acids, more preferably, alkylcarboxylic acids, such as acetic acid, butyric acid, isovaleric acid, caproic acid, caprylic acid, capric acid, lauric acid, myristic acid, palmitic acid, stearic acid, oleic acid, linoleic acid and linolenic acid, can be used as the carboxylic acid component.

Preferred carboxylic acid esters of polyhydric alcohols include esters of 1,2,3-propanetriol (glycerol), 1,1,1-trimethylolpropane, pentaerythritol, maltose and sorbitan with $C_2$–$C_{18}$-alkylcarboxylic acids.

More preferred carboxylic acid esters of polyhydric alcohols include mono-, di-, tri- or tetraesters of 1,2,3-propanetriol (glycerol), pentaerythritol and sorbitan with $C_2$–$C_{18}$-alkylcarboxylic acids.

Methods for preparing carboxylic acid esters of polyhydric alcohols or their isolation from fats are known and are described in *Kirk-Othmer, Encyclopedia of Chemical Technology*, Vol. 9, 3rd Ed., 1980, page 795 et seq.; in *Römpp, Lexikon Chemie, Römpp's Chemical Dictionary*, 8th Ed., Stuttgart/New York, 1981; and in *Ullmann's Encyclopedia of Industrial Chemistry*, Vol. A10, 5th Ed., 1987, p. 173–218.

Suitable bile acids useful for component c) include $C_{24}$-steroid-carboxylic acids which are breakdown products of cholesterol and are in general derived from 5β-cholan-24-oic acid by introduction of hydroxyl groups in the α-position on C-3, C-6, C-7 and C-12.

Preferred bile acids are represented by the general formula

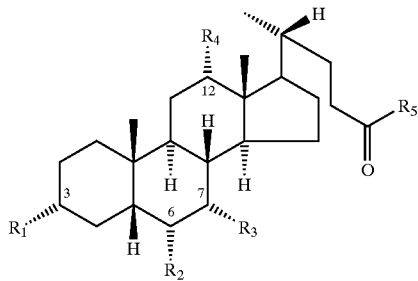

wherein $R_1$, $R_2$, $R_3$ and $R_4$, independently of one another, denote H or OH; and $R_5$ denotes OH, NH—$CH_2$—COOH, NH—$CH_2$—$CH_2$—$SO_3H$, NH—$(CH_2)_3$—$N^+(CH_3)_2$—$CH_2CHOH$—$CH_2$—$SO_3^-$ or NH—$(CH_2)_3$—$N^+(CH_3)_2(CH_2)_3$—$SO_3^-$; the free acids or salts thereof, preferably, alkali metal or alkaline earth metal salts, and esters thereof, preferably, with alkyl radicals having 1 to 30 C atoms, and amides thereof, preferably, with alkyl radicals or sulfoalkyl, sulfoalkylaminoalkyl, sulfohydroxyalkylaminoalkyl and carboxyalkyl radicals in the acid or salt form, can be used in the present invention.

Examples of suitable bile acids, salts, esters and amides thereof include cholic acid (3α,7α,12α-trihydroxy-5β-cholan-24-oic acid; $R_1$=$R_3$=$R_4$=$R_5$=OH, $R_2$=H), cholic acid sodium salt (sodium cholate), lithium cholate, potassium cholate, glycol-cholic acid (3α,7α,12α-trihydroxy-5β-cholan-24-oic acid N-[carboxymethyl]amide; $R_1$=$R_3$=$R_4$=OH, $R_2$=H, $R_5$=NH—$CH_2$—COOH), sodium glycocholate, taurocholic acid (3α,7α,12α-trihydroxy-5β-cholan-24-oic acid N-[2-sulfoethyl]amide; $R_1$=$R_3$=$R_4$=OH, $R_2$=H, $R_5$=NH—$CH_2$—$CH_2$—$SO_3H$), sodium taurocholate, deoxycholic acid (3α,12α-dihydroxy-5β-cholan-24-oic acid; $R_1$=$R_4$=$R_5$=OH, $R_2$=$R_3$=H), sodium deoxycholate, potassium deoxycholate, lithium deoxycholate, glycodeoxycholic acid (3α,12α-dihydroxy-5β-cholan-24-oic acid N-[carboxymethyl]amide; $R_1$=$R_4$=OH, $R_2$=$R_3$=H, $R_5$=NH—$CH_2$—COOH), sodium glycodeoxycholate, taurodeoxycholic acid (3α,12α-dihydroxy-5β-cholan-24-oic acid N[2-sulfoethyl]amide; $R_1$=$R_4$=OH, $R_2$=$R_3$=H, $R_5$=NH—$CH_2$—$CH_2$—$SO_3H$), sodium taurodeoxycholate, chenodeoxycholic acid (3α,7α-dihydroxy-5β-cholan-24-oic acid; $R_1$=$R_3$=$R_5$=OH, $R_2$=$R_4$H), sodium chenodeoxycholate, glycochenodeoxycholic acid (3α,7α-dihydroxy-5β-cholan-24-oic acid N-[carboxymethyl]amide; $R_1$=$R_3$=OH, $R_2$=$R_4$=H, $R_5$=NH—$CH_2$—COOH), sodium glycochenodeoxycholate, taurochenodeoxycholic acid (3α,7α-dihydroxy-5β-cholan-24-oic acid N-[2-sulfoethyl]amide; $R_1$=$R_3$=OH, $R_2$=$R_4$=H, $R_5$=NH—$CH_2$—$CH_2SO_3H$), sodium taurochenodeoxycholate, lithocholic acid (3α-hydroxy-5β-cholan-24-oic acid; $R_1$=$R_5$=OH, $R_2$=$R_3$=$R_4$=H), sodium lithocholate, potassium lithocholate, hyocholic acid (3α,6α,7α-trihydroxy-5β-cholan-24-oic acid; $R_1$=$R_2$=$R_3$=$R_5$=OH, $R_4$=H), sodium hyocholate, lithium hyocholate, potassium hyocholate, hyodeoxycholic acid (3α,6α-dihydroxy-5β-cholan-24-oic acid; $R_1$=$R_2$=$R_5$=OH; $R_3$==H), sodium hyodeoxycholate, lithium hyodeoxycholate, potassium hyodeoxycholate, cholic acid methyl ester, cholic acid ethyl ester, deoxycholic acid ethyl ester and hyocholic acid methyl ester.

The sodium, lithium and potassium salts and the methyl or ethyl esters of cholic acid, glycocholic acid, taurocholic acid, deoxycholic acid, glycodeoxycholic acid, taurodeoxycholic acid, chenodeoxycholic acid, glycochenodeoxycholic acid, taurochenodeoxycholic acid, lithocholic acid, hyocholic acid, hyodeoxycholic acid and mixtures thereof are preferred.

Bile acids such as ursocholic acid (3α,7β,12α-trihydroxy-5β-cholan-24-oic acid), ursodeoxycholic acid (3α,7β-dihydroxy-5β-cholan-24-oic acid), 7-oxo-lithocholic acid (3α-hydroxy-7-oxo-5β-cholan-24-oic acid), lithocholic acid 3-sulfate (3α-hydroxy-5β-cholan-24-oic acid 3-sulfate), nor-cholic acid and bisnor-cholic acid and salts, esters and amides thereof can be used in the present invention.

Bile acids and salts, esters and amides thereof are known and are described in *Nachr. Chem. Tech. Lab.* 43 (1995) 1047; in Setchell et al.: *The Bile Acids*, Vol. 4, Plenum, New York 1998; and in *Römpp, Lexikon Naturstoffe, Römpp's Dictionary of Naturally Occurring Substances*, Stuttgart, New York 1997, p. 248 et seq.

Suitable cyclodextrins useful for component c) include unsubstituted cyclodextrins and their ester, alkyl ether, hydroxyalkyl ether, alkoxycarbonylalkyl ether and carboxyalkyl ether derivatives and salts thereof.

Cyclodextrins are cyclohexa-, cyclohepta- or cyclooctaamyloses with 6, 7 or 8 1,4-linked glucose units, which are formed by the breakdown of starch by *Bacillus macerans* or *Bacillus circulans* under the action of cyclodextrin glycosyl transferase, such as, for example, α-, β-, γ- or δ-cyclodextrin.

Aryl-, aralkyl- and alkylcarboxylic acids having 2 to 30 C atoms, preferably, 2 to 24 C atoms, more preferably, 2 to 20 C atoms, preferably aralkyl- and alkylcarboxylic acids, more preferably, alkylcarboxylic acids, are suitable as the carboxylic acid component for the cyclodextrin esters.

Linear or branched alkyl groups having 1 to 30 C atoms, preferably, 1 to 24 C atoms, more preferably, 1 to 20 C atoms, can be used as the alkyl component for the cyclodextrin alkyl ethers, -hydroxyalkyl ethers, -alkoxycarbonylalkyl ethers and -carboxyalkyl ethers.

Cyclodextrins preferably used in the present invention include α-, β- and γ-cyclodextrins and their mono-, di- and triethers, mono-, di- and triesters and monoester/diethers, which are typically obtained by etherification of α-, β- and γ-cyclodextrins with alkylating agents, such as, for example, dimethyl sulfate or alkyl halides having 1 to 30 C atoms, such as, for example, methyl, ethyl, propyl, butyl, pentyl, hexyl, heptyl and octyl chloride, bromide and iodide, and/or esterification with acetic acid or succinic acid in the presence of acids.

Preferred are methyl-α-cyclodextrin, methyl-α-cyclodextrin, methyl-γ-cyclodextrin, ethyl-β-cyclodextrin, butyl-α-cyclodextrin, butyl-β-cyclodextrin, butyl-γ-cyclodextrin, 2,6-dimethyl-α-cyclodextrin, 2,6-dimethyl-β-cyclodextrin, 2,6-dimethyl-γcyclodextrin, 2,6-diethyl-β-cyclodextrin, 2,6-dibutyl-βcyclodextrin, 2,3,6-trimethyl-αcyclodextrin, 2,3,6-trimethyl-βcyclodextrin, 2,3,6-trimethyl-γ-cyclodextrin, 2,3,6-trioctyl-α-cyclodextrin, 2,3,6-trioctyl-β-cyclodextrin, 2,3,6-triacetyl-α-cyclodextrin, 2,3,6-triacetyl-β-cyclodextrin, 2,3,6-triacetyl-γ-cyclodextrin, (2-hydroxy)propyl-γ-cyclodextrin, (2-hydroxy)propyl-β-cyclodextrin, (2-hydroxy)propyl-γ-cyclodextrin, partly or completely acetylated and succinylated α-, β- or γ-cyclodextrin, 2,6-dimethyl-3-acetyl-β-cyclodextrin and 2,6-dibutyl-3-acetyl-α-cyclodextrin.

Methods for preparing cyclodextrins are known and are described in *Römpp, Lexikon Chemie, Römpp's Chemical*

*Dictionary*, 10th Ed., Stuttgart/New York 1997, p. 845 et seq.; and in *Chemical Reviews* 98 (1988)1743.

Phosphorus compounds which are suitable as component c) include organic phosphates, such as, for example, mono-, di- and triesters of phosphoric acid, mono-, di-, tri- and tetraesters of pyrophosphoric acid and mono-, di-, tri-, tetra- and polyesters of polyphosporic acid and alcohols having 1 to 30 atoms.

Suitable organic phosphites include mono-, di- and triesters of phosphorous acid and alcohols having 1 to 30 C atoms.

Suitable organic phosphonates include mono- and diesters of phosphonic acid, alkylphosphonic acids, arylphosphonic acids, alkoxycarbonylalkylphosphonic acids, alkoxycarbonylphosphonic acids, cyanoalkylphosphonic acids and cyanophosphonic acids, and mono-, di-, tri- and tetraesters of alkyldiphosphonic acids and alcohols having 1 to 30 C atoms.

Suitable phosphonites include diesters of phosphonous acid and arylphosphonous acid and alcohols having 1 to 30 C atoms.

Suitable phosphinates include esters of phosphinic acid, alkylphosphinic acids, dialkylphosphinic acids and arylphosphinic acids and alcohols having 1 to 30 C atoms.

Suitable phosphinites include esters of alkylphosphinous acid, dialkylphosphinous acid and arylphosphinous acid and alcohols having 1 to 30 C atoms.

Mono- and polyhydric aryl, aralkyl, alkoxyalkyl and alkyl alcohols having 1 to 30 C atoms, preferably, 1 to 24 C atoms, more preferably, 1 to 20 C atoms, preferably, aralkyl, alkoxyalkyl and alkyl alcohols, more preferably, alkoxyalkyl and alkyl alcohols, can be used as the alcohol component.

Organic phosphates, phosphites, phosphonates, phosphonites, phosphinates and phosphinites useful in the present invention are typically obtained by reacting phosphoric acid, pyrophosphoric acid, polyphosphoric acids, phosphonic acid, alkylphosphonic acids, arylphosphonic acids, alkoxycarbonylalkylphosphonic acids, alkoxycarbonylphosphonic acids, cyanoalkylphosphonic acids, cyanophosphonic acid, alkyldiphosphonic acids, phosphonous acid, phosphorous acid, phosphinic acid, phosphinous acid or halogen derivatives thereof or phosphorus oxides with hydroxy compounds having 1 to 30 C atoms, such as methanol, ethanol, propanol, butanol, pentanol, hexanol, 2-ethylhexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, 1,2-ethanediol, 1,2-propanediol, 1,2,3-trihydroxypropane, 1,1,1-trimethylolpropane and pentaerythritol.

Phosphoric acid triethyl esters, phosphoric acid tributyl esters, phosphoric acid trioctyl esters, phosphoric acid tris (2-ethylhexyl) esters, phosphoric acid tris-(2-butoxyethyl) esters, butylphosphonic acid dibutyl esters, phenylphosphonic acid dioctyl esters, phosphonoformic acid triethyl esters, phosphonoacetic acid trimethyl esters, phosphonoacetic acid triethyl esters, 2-phosphonopropionic acid trimethyl esters, 2-phosphonopropionic acid triethyl esters, 2-phosphonopropionic acid tripropyl esters, 2-phosphonopropionic acid tributyl esters, 3-phosphonopropionic acid triethyl esters, tributyl phosphite, trilauryl phosphites, tris-(3-ethyloxethanyl-3-methyl) phosphites and heptakis-(dipropylene glycol) phosphites are preferred.

Methods for preparing phosphoric acid, phosphorous acid, phosphonic acid, phosphonous acid, phosphinic acid and phosphinous acid esters are known and are described in *Kirk-Othmer Encyclopedia of Chemical Technology*, Vol. 18, 4th Ed., 1996, p. 737 et seq.; in *Röpp, Lexikon Chemie, Römpp's Chemical Dictionary*, Vol. 4, 10th Ed., Stuttgart/New York, 1998, p. 3280 et seq.; in *Ullmann's Encyclopedia of Industrial Chemistry*, Vol. A19, 5th Ed., 1991, p. 545 et seq.; and in *Houben-Weyl, Methoden der Organischen Chemie* [Methods of Organic Chemistry], Volumes XII/1 and XII/2, Stuttgart 1963/1964.

$\alpha,\beta$-unsaturated carboxylic acid esters suitable as component c) include mono-, di-, tri- and polyesters of acrylic acid and alkyl, alkoxy, alkoxycarbonyl and alkoxycarbonylalkylacrylic acids with alcohols having 1 to 30 C atoms and polyether-polyols.

Mono-, di-, tri- and polyhydric aryl, aralkyl, alkoxyalkyl and alkyl alcohols having 1 to 30 C atoms, preferably, 1 to 24 C atoms, more preferably, 1 to 20 C atoms, preferably, aralkyl, alkoxyalkyl and alkyl alcohols, more preferably, alkoxyalkyl and alkyl alcohols, can be used for the alcohol component.

Polyalkylene glycols and polyalkylene glycol ethers, preferably, polypropylene glycols and polyethylene glycols and their ethers with molecular weights of 200 to 10,000, preferably, 300 to 9,000, more preferably, 400 to 8,000, can also be used for the alcohol component.

$\alpha,\beta$-unsaturated carboxylic acids useful in the present invention include acrylic acid and alkyl-, alkoxy- and alkoxycarbonylalkylacrylic acids having 1 to 20 C atoms, such as 2-methylacrylic acid (methacrylic acid), 3-methylacrylic acid (crotonic acid), trans-2,3-dimethylacrylic acid (tiglic acid), 3,3-dimethylacrylic acid (senecioic acid) and 3-methoxyacrylic acid, preferably, acrylic acid, 2-methylacrylic acid, 3-methylacrylic acid and 3-methoxyacrylic acid, more preferably, acrylic acid and 2-methylacrylic acid.

$\alpha,\beta$-unsaturated carboxylic acid esters useful in the present invention are typically obtained by esterification of mono-, di-, tri-, tetra- or polyhydroxy compounds having 1 to 30 C atoms, such as methanol, ethanol, ethanediol (ethylene glycol), 1-propanol, 2-propanol, 1,2-propanediol, 1,3-propanediol, 1,2,3-propanetriol (glycerol), butanol, 2-butanol, i-butanol, 1,2-butanediol, 1,3-butanediol, 2,3-butanediol, 1,4-butanediol, 1,2,3-butanetriol, 1-pentanol, 1-hexanol, 1-heptanol, 1-octanol, 1-nonanol, 1-decanol, 1-dodecanol, 1-tridecanol, 1-tetradecanol, 1-hexadecanol, 1-heptadecanol, 9-octadecanol, 1,1,1-tris-(hydroxymethyl)-propane, pentaerythritol, methoxymethanol, ethoxymethanol, propoxymethanol, butoxymethanol, 2-ethoxyethanol, 2-propoxyethanol, 2-butoxyethanol, methyl hydroxyacetate, ethyl hydroxyacetate, propyl hydroxyacetate, methyl hydroxypropionate, ethyl hydroxypropionate, propyl hydroxypropionate or polyether-polyols, such as polyethylene glycols and polypropylene glycols, with the corresponding $\alpha,\beta$-unsaturated carboxylic acids, optionally, in the presence of catalysts.

Mono-, di- and triesters of acrylic acid and methacrylic acid with ethanediol, 1,2-propanediol, 1,3-propanediol, 1,4-butanediol, 1,6-hexanediol, 1,2,3-propanetriol, 1,1,1-tris-(hydroxymethyl)-propane, 1,1,1-tris-(hydroxymethyl)-propane ethoxylates, 1,1,1-tris-(hydroxymethyl)-propane propoxylates, polyethylene glycols and polypropylene glycols are preferred.

More preferred $\alpha,\beta$-unsaturated carboxylic acid esters are polyethylene glycol acrylate, polyethylene glycol diacrylate, polyethylene glycol methacrylate, polyethylene glycol dimethacrylate, polypropylene glycol acrylate, polypropylene glycol diacrylate, polypropylene glycol methacrylate, polypropylene glycol dimethacrylate, 1,2,3-propanetriol diacrylate, 1,2,3-propanetriol dimethacrylate, 1,2,3-propanetriol triacrylate, 1,2,3-propanetriol-1,3-(2-hydroxypropoxylate)diacrylate, 1,2,3-propanetriol-propoxylate triacrylate, 1,4-butanediol acrylate, 1,4-butanediol dimethacrylate, 1,6-hexanediol diacrylate, 2-hydroxypropyl methacrylate, 1,1,1-tris-(hydroxymethyl) propane triacrylate, 1,1,1-tris(hydroxymethyl)propane-ethoxylate triacrylate, 1,1,1-tris(hydroxymethyl)propane-ethoxylate trimethacrylate, 1,1,1-tris(hydroxymethyl) propane-propoxylate triacrylate and 1,1,1-tris (hydroxymethyl)propane-propoxylate trimethacrylate.

Methods for preparing $\alpha,\beta$-unsaturated carboxylic acid esters are known and are described in for *Kirk-Othmer, Encyclopedia of Chemical Technology*, Vol. 18, 4th Ed., 1996, p. 737 et seq.; in *Römpp, Lexikon Chemie [Römpp's Chemical Dictionary]*, Vol. 4, 10th Ed., Stuttgart/New York 1998, p. 3286 et seq.; in *Ullmann's Encyclopedia of Industrial Chemistry*, Vol. A19, 5th Ed., 1991, p. 545 et seq.; and in *Houben-Weyl: Methoden der Organischen Chemie* [Methods of Organic Chemistry], Vol. XII/1 and XII/2, Stuttgart 1963/1964.

A structural feature of the ionic surface or interface-active compounds suitable as component c) includes amphiphilic molecular structures. "Amphiphilic molecular structures" means that the ionic surface or interface-active compounds have at least one hydrophilic ionic group (or at least one hydrophilic ionic molecular portion) and at least one hydrophobic group (or at least one hydrophobic molecular portion). Examples of such ionic surface or interface-active compounds include surfactants, soaps, emulsifiers, detergents and dispersing agents.

The hydrophilic ionic groups can be anionic, cationic or zwitter-ionic (amphoteric) in nature. Examples of anionic groups include carboxylates, sulfonates, sulfates, thiosulfates, phosphonates, phosphinates, phosphates and dithiophosphate groups. Examples of cationic groups include ammonium, phosphonium and sulfonium groups. Examples of zwitter-ionic groups include betaine, sulfobetaine and amine oxide groups.

The hydrophobic groups are, preferably, $C_2$–$C_{50}$-hydrocarbon radicals, such as aryl, aralkyl and alkyl radicals. However, fluoroalkyl, silaalkyl, thiaalkyl and oxaalkyl groups are also suitable for use in the present invention.

Examples of suitable compounds with hydrophilic anionic groups include carboxylates, such as alkyl carboxylates (soaps), ether-carboxylates (carboxymethylated ethoxylates), polycarboxylates, such as malonates and succinates, bile acid salts, e.g. bile acid amides with sulfoalkyl and carboxyalkyl radicals in the salt form, amino acid derivatives, such as sarcosides (alkanoylsarcosinates), sulfonamidocarboxylates, sulfates, such as alkyl sulfates, ether-sulfates, e.g. fatty alcohol ether-sulfates, aryl ether-sulfates and amidoether-sulfates, sulfated carboxylates, sulfated carboxylic acid glycerides, sulfated carboxylic acid esters, sulfated carboxylic acid amides, sulfonates, e.g. alkyl-, aryl- and alkylarylsulfonates, sulfonated carboxylates, sulfonated carboxylic acid esters, sulfonated carboxylic acid amides, carboxyl ester-sulfonates, such as $\alpha$-sulfo-fatty acid esters, carboxamide-sulfonates, sulfosuccinic acid esters, ether-sulfonates, thiosulfates, phosphates, e.g. alkyl phosphates and glycerol phosphates, phosphonates, phosphinates and dithiophosphates.

Examples of suitable compounds with hydrophilic cationic groups include primary, secondary, tertiary and quaternary ammonium salts with alkyl, aryl and aralkyl radicals, alkoxylated ammonium salts, quaternary ammonium esters, benzylammonium salts, alkanolammonium salts, pyridinium salts, imidazolinium salts, oxazolinium salts, thiazolinium salts, salts of amine oxides, sulfonium salts, quinolinium salts, isoquinolinium salts and tropylium salts.

Examples of suitable compounds with hydrophilic zwitter-ionic (amphoteric) groups include amine oxides, imidazolinium derivatives, such as imidazolinium carboxylates, betaines, e.g., alkyl- and aminopropylbetaines, sulfobetaines, aminocarboxylic acids and phospholipids, e.g., phosphatidylcholine (lecithin).

The ionic surface or interface-active compounds can also contain several hydrophilic (anionic and/or cationic and/or zwitter-ionic) groups or molecular portions.

The ionic surface or interface-active compounds which are suitable for use in the present invention are known and are described in *Ullmann's Encyclopedia of Industrial Chemistry*, 5th Ed., Vol. A25, p. 747–817, VCH, Weinheim, 1994; in *Kirk-Othmer, Encyclopedia of Chemical Technology*, 4th Ed., Vol. 23, p. 477–541, John Wiley & Sons, New York, 1997; in *Carl Hanser Veraci, Tensid-Taschenbuch* [Surfactants Handbook], 2nd Ed., H Stache, Munich, 1982; in *Marcel Decker, Surfactant Science Series*, Vol. 1–74, M. J. Schick (Consulting Editor), New York, 1967–1998; and in *Methods in Enzymology*, Vol. 182, M. P. Deutscher (ed.), p. 239–253, Academic Press, San Diego, 1990.

The DMC catalysts of the present invention 25 component c) comprise two different complexing components of the complexing components described.

In a preferred embodiment of the present invention, the DMC catalysts comprise complexing components which comprise a combination of phosphorus compounds with $\alpha,\beta$-unsaturated carboxylic acid esters, of phosphorus compounds with cyclodextrins, of phosphorus compounds with polyesters, of phosphorus compounds with glycosides, or of phosphorus compounds with bile acids or salts, esters or amides thereof. Complexing components which comprise a combination of phosphorus compounds with $\alpha,\beta$-unsaturated carboxylic acid esters, of phosphorus compounds with polyesters, phosphorus compounds with glycosides, or of phosphorus compounds with bile acids or salts, esters or amides thereof are particularly preferred.

In another preferred embodiment of the present invention, the DMC catalysts comprise complexing components which comprise a combination of carboxylic acid esters of polyhydric alcohols with $\alpha,\beta$-unsaturated carboxylic acid esters, of carboxylic acid esters of polyhydric alcohols with cyclodextrins, of carboxylic acid esters of polyhydric alcohols with polyesters, of carboxylic acid esters of polyhydric alcohols with glycosides, of carboxylic acid esters of polyhydric alcohols with glycidyl ethers, of carboxylic acid esters of polyhydric alcohols with bile acids or salts, esters or amides thereof, or of carboxylic acid esters of polyhydric alcohols with phosphorus compounds. Complexing components which comprise a combination of carboxylic acid esters of polyhydric alcohols with $\alpha,\beta$-unsaturated carboxylic acid esters, of carboxylic acid esters of polyhydric alcohols with polyesters, of carboxylic acid esters of polyhydric alcohols with glycosides, of carboxylic acid esters of polyhydric alcohols with glycidyl ethers, or of carboxylic acid esters of polyhydric alcohols with bile acids or salts, esters or amides thereof are particularly preferred.

In another preferred embodiment of the present invention, the DMC catalysts comprise complexing components which comprise a combination of $\alpha,\beta$-unsaturated carboxylic acid esters with cyclodextrins, of α,β-unsaturated carboxylic acid esters with polyesters, of α,β-unsaturated carboxylic acid esters with glycosides, of α,β-unsaturated carboxylic acid esters with bile acids or salts, esters or amides thereof, of α,β-unsaturated carboxylic acid esters with phosphorus compounds, or of α,β-unsaturated carboxylic acid esters with carboxylic acid esters of polyhydric alcohols. Complexing components which comprise a combination of α,β-unsaturated carboxylic acid esters with glycosides, of α,β-unsaturated carboxylic acid esters with bile acids or salts, esters or amides thereof, or of α,β-unsaturated carboxylic acid esters with phosphorus compounds are particularly preferred.

In yet another preferred embodiment of the present invention, the DMC catalysts comprise complexing components which comprise a combination of cyclodextrins with glycidyl ethers, of cyclodextrins with bile acids or salts, esters or amides thereof, of cyclodextrins with phosphorus compounds, of cyclodextrins with carboxylic acid esters of polyhydric alcohols, or of cyclodextrins with α,β-unsaturated carboxylic acid esters. Complexing components which comprise a combination of cyclodextrins with glycidyl ethers, of cyclodextrins with bile acids or salts, esters or amides thereof, or of cyclodextrins with α,β-unsaturated carboxylic acid esters are particularly preferred.

In another preferred embodiment of the present invention, the DMC catalysts comprise complexing components which comprise a combination of polyesters with phosphorus compounds, of polyesters with carboxylic acid esters of polyhydric alcohols, or of polyesters with α,β-unsaturated carboxylic acid esters.

In another preferred embodiment of the present invention, the DMC catalysts comprise complexing components which comprise a combination of glycosides with glycidyl ethers, of glycosides with bile acids or salts, esters or amides thereof, of glycosides with phosphorus compounds, of glycosides with carboxylic acid esters of polyhydric alcohols, or of glycosides with α,β-unsaturated carboxylic acid esters.

In yet another preferred embodiment of the present invention, the DMC catalysts comprise complexing components which comprise a combination of glycidyl ethers with bile acids or salts, esters or amides thereof, of glycidyl ethers with phosphorus compounds, of glycidyl ethers with carboxylic acid esters of polyhydric alcohols, of glycidyl ethers with α,β-unsaturated carboxylic acid esters, of glycidyl ethers with cyclodextrins, or of glycidyl ethers with glycosides.

In another preferred embodiment of the present invention, the DMC catalysts comprise complexing components which comprise a combination of bile acids or salts, esters or amides thereof with phosphorus compounds, of bile acids or salts, esters or amides thereof with carboxylic acid esters of polyhydric alcohols, of bile acids or salts, esters or amides thereof with α,β-unsaturated carboxylic acid esters, of bile acids or salts, esters or amides thereof with cyclodextrins, of bile acids or salts, esters or amides thereof with glycosides, or of bile acids or salts, esters or amides thereof with glycidyl ethers.

The DMC catalysts of the present invention are typically analyzed with elemental analysis, thermogravimetry or extractive removal of the complexing components with subsequent gravimetric determination. The DMC catalysts of the present invention can be crystalline, partly crystalline or amorphous. The crystallinity is typically analyzed by powder X-ray diffraction.

A preferred DMC catalyst according to the present invention comprises zinc hexacyanocobaltate(III) for component a) and tert-butanol for component b).

The DMC catalyst of the present invention is typically prepared in aqueous solution by reacting a metal salt, preferably one represented by the formula (I), with a metal cyanide salt, preferably one represented by the formula (II), in the presence of an organic complexing ligand b), which is not a functionalized polymer, glycidyl ether, glycoside, carboxylic acid ester of polyhydric alcohol, bile acid or salt, ester or amide thereof, cyclodextrin, phosphorus compound or an α,β-unsaturated carboxylic acid ester, nor an ionic surface or interface-active compound and in the presence of complexing components c).

Preferably, the aqueous solution of the metal salt (for example, zinc chloride, employed in stoichiometric excess (at least 50 mol %, based on the metal cyanide salt)) and the metal cyanide salt (for example, potassium hexacyanocobaltate) are first reacted in the presence of the organic complexing ligand b) (for example, tert-butanol). A suspension comprising the DMC compound a) (for example, zinc hexacyanocobaltate), water, excess metal salt, and the organic complexing ligand b) is formed.

The organic complexing ligand b) is either present in the aqueous solution of the metal salt and/or the metal cyanide salt, or is added directly to the suspension after precipitation of the DMC compound a). Preferably, the mixture of aqueous solution and organic complexing ligand b) is vigorously stirred. The suspension formed is then treated with a mixture of the complexing components c). The mixture of complexing components c) is preferably used in a mixture of water and organic complexing ligand b).

The DMC catalyst is then isolated from the suspension by known techniques, such as centrifugation or filtration. In a preferred embodiment of the present invention, the isolated DMC catalyst is washed with an aqueous solution of the organic complexing ligand b) (for example, by resuspension and then renewed isolation by filtration or centrifugation). Water-soluble by-products, for example, potassium chloride, are removed from the DMC catalyst by washing the DMC catalyst with an aqueous solution of the organic compexing ligand b).

The amount of organic complexing ligand b) in the aqueous wash solution is preferably between 40 and 80 wt. %, based on the total weight of aqueous wash solution. Preferably, a small amount of the complexing components c), preferably 0.5 to 5 wt. %, based on the total weight of aqueous wash solution, is added to the aqueous wash solution.

Preferably, the DMC catalyst is washed more than once. This can be accomplished by repeating the aqueous wash solution procedure described above. However, the use of a non-aqueous wash solution for further washing operations is preferred. The non-aqueous wash solution comprises a mixture of organic complexing ligand b) and complexing components c).

The washed catalyst is then dried, optionally after pulverization, at temperatures of in general 20–100° C. and under pressures of in general 0.1 mbar to 1,013 mbar.

The present invention also provides the use of the DMC catalysts according to the invention in a process for the preparation of polyether-polyols by polyaddition of alkylene oxides on to starter compounds containing active hydrogen atoms.

Alkylene oxides preferably used in the present invention are ethylene oxides, propylene oxides, butylene oxides and mixtures thereof. The build-up of the polyether chains by alkoxylation can be accomplished by using only one monomeric epoxide, or randomly or blockwise with 2 or 3 different monomeric epoxides. Further details in this regard can be found in *Ullmann's Encyclopädie der industriellen Chemie*, Vol. A21, 1992, p. 670 et seq.

Starter compounds containing active hydrogen atoms which are preferably used in the present invention are compounds with number average molecular weights of 18 to 2,000 with 1 to 8 hydroxyl groups. Examples of such starter compounds are ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, sucrose, degraded starch and water.

A starter compound containing active hydrogen atoms which has been prepared by conventional alkali catalysis from a low molecular weight starter compound mentioned above and is an oligomeric alkoxylation product with a number average molecular weight of 200 to 2,000 is preferably used in the present invention.

The polyaddition, catalyzed by the DMC catalyst of the present invention, of an alkylene oxide on to a starter compound containing active hydrogen atoms is carried out at a temperature between 20 to 200° C., preferably between 40 to 180° C., more preferably, between 50 to 150° C. The reaction can be carried out under an overall pressure of 0.0001 to 20 bar. The polyaddition can be carried out in bulk or an inert organic solvent, such as toluene and/or tetrahydrofuran ("THF"). The amount of solvent is usually 10 to 30 wt. %, based on the total weight of polyether polyol to be prepared.

The DMC catalyst concentration is chosen such that sufficient control of the polyaddition reaction is possible under the given reaction conditions. The catalyst concentration is typically in the range from 0.0005 wt. % to 1 wt. %, preferably, 0.001 wt. % to 0.1 wt. %, more preferably, 0.001 to 0.0025 wt. %, based on the total weight of polyether polyol to be prepared.

The number average molecular weight of the polyether polyol prepared by the process of the present invention is in the range from 500 to 100,000 g/mol, preferably, 1,000 to 50,000 g/mol, more preferably, 2,000 to 20,000 g/mol.

The polyaddition can be carried out continuously or discontinuously, (e.g. in a batch or in semi-batch process).

Because of their significantly increased activity, the DMC catalysts of the present invention can be used in low concentrations (100 ppm and less, based on the amount of polyether polyol to be prepared). In the preparation of polyurethanes, if a polyether polyol is prepared in the presence of the DMC catalyst according to the present invention, the step of removing the DMC catalyst from the polyether polyol can be omitted without adversely affecting the product quality of the resulting polyurethane. *Kunststoffhandbuch*, Vol. 7, *Polyurethane,* 3rd Ed. 1993, p. 25–32 and 57–67.

EXAMPLES

Catalyst Preparation

Example 1

Preparation of a DMC Catalyst Comprising a Phosphorus Compound and an α,β-Unsaturated Carboxylic Acid Ester (Catalyst I):

A solution of 12.5 g (91.5 mmol) zinc chloride in 20 ml distilled water was added to a solution of 4 g (12 mmol) potassium hexacyanocobaltate in 70 ml distilled water with vigorous stirring (24,000 rpm). Immediately thereafter, a mixture of 50 g tert-butanol and 50 g distilled water was added to the suspension formed and the mixture was then stirred vigorously (24,000 rpm) for 10 min. A mixture of 0.5 g polyethylene glycol diacrylate ($M_n$ 575 g/mol) and 0.5 g 2-phosphonopropionic acid triethyl ester, 1 g tert-butanol and 100 g distilled water was then added and the mixture was stirred (1,000 rpm) for 3 min. The solid was isolated by filtration, subsequently stirred (10,000 rpm) for 10 min with a mixture of 70 g tert-butanol, 30 g distilled water, 0.5 g glycerol tricaproate and 0.5 g 2-phosphonopropionic acid triethyl ester and filtered again. Finally, the solid was stirred (10,000 rpm) again for 10 min with a mixture of 100 g tert-butanol, 0.5 g polyethylene glycol diacrylate ($M_n$ 575 g/mol) and 0.5 g 2-phosphonopropionic acid triethyl ester. After filtration, the catalyst was dried to constant weight at 50° C. under normal pressure.

Yield of dried, pulverulent catalyst: 6.0 g.
Elemental analysis:
Cobalt=10.9 wt. %; Zinc=24.9 wt. %.

Example 2

Preparation of a DMC Catalyst Comprising a Phosphorus Compound and a Cyclodextrin (Catalyst II):

The same procedure as set forth in Example 1 was used, except that instead of using polyethylene glycol diacrylate and 2-phosphonopropionic acid triethyl ester, 2,6-dimethyl-β-cyclodextrin (BETA W 7 M 1.8, available from Wacker-Chemie GmbH, D-81737 Munich) and 2-phosphonopropionic acid triethyl ester were used as the complexing components.

Yield of dried, pulverulent catalyst: 4.8 g.
Elemental analysis:
Cobalt=10.7 wt. %; Zinc=24.3 wt. %.

Example 3

Preparation of a DMC Catalyst Comprising a Phosphorus Compound and a Polyester (Catalyst III):

The same procedure as set forth in Example 1 was used, except that instead of using polyethylene glycol diacrylate and 2-phosphonopropionic acid triethyl ester, poly(2-methyl-1,3-propylene glutarate) ($M_n$ 1,020) and 2-phosphonopropionic acid triethyl ester were used as the complexing components.

Yield of dried, pulverulent catalyst: 4.4 g.
Elemental analysis:
Cobalt 9.9 wt. %; Zinc=23.4 wt. %.

Example 4

Preparation of a DMC Catalyst Comprising a Phosphorus Compound and a Glycoside (Catalyst IV):

The same procedure as set forth in Example 1 was used, except that instead of using polyethylene glycol diacrylate and 2-phosphonopropionic acid triethyl ester, an alkyl polyglycoside (GLUCOPON® 650 EC, available from Henkel KG aA, D40589 Düsseldorf) and 2-phosphonopropionic acid triethyl ester were used as the complexing components.

Yield of dried, pulverulent catalyst: 4.3 g.
Elemental analysis:
Cobalt=11.2 wt. %; Zinc=25.2 wt. %.

Example 5

Preparation of a DMC Catalyst Comprising a Phosphorus Compound and a Bile Acid Derivative (Catalyst V):

The same procedure as set forth in Example 1 was used, except that instead of using polyethylene glycol diacrylate and 2-phosphonopropionic acid triethyl ester, cholic acid sodium salt and 2-phosphonopropionic acid triethyl ester were used as the complexing components.

Yield of dried, pulverulent catalyst: 5.7 g.
Elemental analysis:
Cobalt=14.0 wt. %; Zinc=32.0 wt. %.

Example 6
Preparation of a DMC Catalyst Comprising a Carboxylic Acid Ester of Polyhydric Alcohol and an α,β-Unsaturated Carboxylic Acid Ester (Catalyst VI):

The same procedure as set forth in Example 1 was used, except that instead of using polyethylene glycol diacrylate and 2-phosphonopropionic acid triethyl ester, polyethylene glycol sorbitan monooleate (DISPONIL® SMO 120, available from Henkel KG aA, 40589 Düsseldorf) and polyethylene glycol diacrylate ($M_n$ 575 g/mol) were used as the complexing components.

Yield of dried, pulverulent catalyst: 5.2 g.
Elemental analysis:
Cobalt=9.6 wt. %; Zinc=21.9 wt. %.

Example 7
Preparation of a DMC Catalyst Comprising a Carboxylic Acid Ester of Polyhydric Alcohol and a Cyclodextrin (Catalyst VII):

The same procedure as set forth in Example 1 was used, except that instead of using polyethylene glycol diacrylate and 2-phosphonopropionic acid triethyl ester, polyethylene glycol sorbitan monooleate (DISPONIL® SMO 120) and 2,6-dimethyl-β-cyclodextrin (BETA W 7 M 1.8) were used as the complexing components.

Yield of dried, pulverulent catalyst: 4.6 g.
Elemental analysis, thermogravimetric analysis and extraction:
Cobalt 10.1 wt. %; Zinc=22.1 wt. %.

Example 8
Preparation of a DMC Catalyst Comprising a Carboxylic Acid Ester of Polyhydric Alcohol and a Polyester (Catalyst VIII):

The same procedure as set forth in Example 1 was used, except that instead of using polyethylene glycol diacrylate and 2-phosphonopropionic acid triethyl ester, glycerol tricaproate and poly(2-methyl-1,3-propylene glutarate) ($M_n$ 1,020) were used as the complexing components.

Yield of dried, pulverulent catalyst: 5.2 g.
Elemental analysis:
Cobalt=10.1 wt. %; Zinc 23.8 wt. %.

Example 9
Preparation of a DMC Catalyst Comprising a Carboxylic Acid Ester of Polyhydric Alcohol and a Glycoside (Catalyst IX):

The same procedure as set forth in Example 1 was used, except that instead of using polyethylene glycol diacrylate and 2-phosphonopropionic acid triethyl ester, glycerol tricaproate and an alkyl polyglycoside (GLUCOPON® 650 EC) were used as the complexing components.

Yield of dried, pulverulent catalyst: 3.8 g.
Elemental analysis:
Cobalt=10.2 wt. %; Zinc 24.7 wt. %.

Example 10
Preparation of a DMC Catalyst Comprising a Carboxylic Acid Ester of Polyhydric Alcohol and a Glycidyl Ether (Catalyst X):

The same procedure as set forth in Example 1 was used, except that instead of using polyethylene glycol diacrylate and 2-phosphonopropionic acid triethyl ester, glycerol tricaproate and polypropylene glycol diglycidyl ether ($M_n$ 640 g/mol) were used as the complexing components.

Yield of dried, pulverulent catalyst: 5.4 g.
Elemental analysis:
Cobalt=11.1 wt. %; Zinc=24.9 wt. %.

Example 11
Preparation of a DMC Catalyst Comprising a Carboxylic Acid Ester of Polyhydric Alcohol and a Bile acid Derivative (Catalyst XI):

The same procedure as set forth in Example 1 was used, except that instead of using polyethylene glycol diacrylate and 2-phosphonopropionic acid triethyl ester, glycerol tricaproate and cholic acid sodium salt were used as the complexing components.

Yield of dried, pulverulent catalyst: 4.5 g.
Elemental analysis:
Cobalt=13.0 wt. %; Zinc=30.0 wt. %.

Example 12
Preparation of a DMC Catalyst Comprising an α,β-Unsaturated Carboxylic Acid Ester and a Cyclodextrin (Catalyst XII):

The same procedure as set forth in Example 1 was used, except that instead of using polyethylene glycol diacrylate and 2-phosphonopropionic acid triethyl ester, polyethylene glycol diacrylate ($M_n$ 575 g/mol) and 2,6-dimethyl-β-cyclodextrin (Beta W 7 M 1.8) were used as the complexing components.

Yield of dried, pulverulent catalyst: 4.7 g.
Elemental analysis:
Cobalt=10.5 wt. %; Zinc=23.5 wt. %.

Example 13
Preparation of a DMC Catalyst Comprising an α,α-Unsaturated Carboxylic Acid Ester and a Polyester (Catalyst XIII):

The same procedure as set forth in Example 1 was used, except that instead of using polyethylene glycol diacrylate and 2-phosphonopropionic acid triethyl ester, polyethylene glycol diacrylate ($M_n$ 575 g/mol) and poly(2-methyl-1,3-propylene glutarate) ($M_n$ 1,020) were used as the complexing components.

Yield of dried, pulverulent catalyst: 5.6 g.
Elemental analysis:
Cobalt 11.3 wt. %; Zinc=25.6 wt. %.

Example 14
Preparation of a DMC Catalyst Comprising an α,β-Unsaturated Carboxylic Acid Ester and a Glycoside (Catalyst (XIV):

The same procedure as set forth in Example 1 was used, except that instead of using polyethylene glycol diacrylate and 2-phosphonopropionic acid triethyl ester, polyethylene glycol diacrylate ($M_n$ 575 g/mol) and an alkyl polyglycoside (GLUCOPON® 650 EC) were used as the complexing components.

Yield of dried, pulverulent catalyst: 4.7 g.
Elemental analysis, thermogravimetric analysis and extraction:
Cobalt=9.5 wt. %; Zinc=21.9 wt. %.

Example 15
Preparation of a DMC Catalyst Comprising an α,β-Unsaturated Carboxylic Acid Ester and a Glycidyl Ether (Catalyst XV):

The same procedure as set forth in Example 1 was used, except that instead of using polyethylene glycol diacrylate and 2-phosphonopropionic acid triethyl ester, polyethylene glycol diacrylate ($M_n$ 575 g/mol) and polypropylene glycol diglycidyl ether ($M_n$ 640 g/mol) were used as the complexing components.

Yield of dried, pulverulent catalyst: 5.3 g.
Elemental analysis:
Cobalt=8.4 wt. %; Zinc=20.4 wt. %.

Example 16

Preparation of a DMC Catalyst Comprising an α,β-Unsaturated Carboxylic Acid Ester and a Bile Acid Derivative (Catalyst XVI):

The same procedure as set forth in Example 1 was used, except that instead of using polyethylene glycol diacrylate and 2-phosphonopropionic acid triethyl ester, polyethylene glycol diacrylate ($M_n$ 575 g/mol) and cholic acid sodium salt were used as the complexing components.

Yield of dried, pulverulent catalyst: 5.6 g.

Elemental analysis:

Cobalt 11.5 wt. %; Zinc 26.4 wt. %.

Example 17

Preparation of a DMC Catalyst Comprising a Cyclodextrin and a Glycidyl Ether (Catalyst XVII):

The same procedure as set forth in Example 1 was used, except that instead of using polyethylene glycol diacrylate and 2-phosphonopropionic acid triethyl ester, polypropylene glycol diglycidyl ether ($M_n$ 640 g/mol) and 2,6-dimethyl-β-cyclodextrin (BETA W 7 M 1.8) were used as the complexing components.

Yield of dried, pulverulent catalyst: 5.1 g.

Elemental analysis:

Cobalt 9.4 wt. %: Zinc 22.4 wt. %.

Example 18

Preparation of a DMC Catalyst Comprising a Cyclodextrin and a Bile Acid Derivative (Catalyst XVIII):

The same procedure as set forth in Example 1 was used, except that instead of using polyethylene glycol diacrylate and 2-phosphonopropionic acid triethyl ester, 2,6-dimethyl-β-cyclodextrin (BETA W 7 M 1.8) and cholic acid sodium salt were used as the complexing components.

Yield of dried, pulverulent catalyst: 4.3 g.

Elemental analysis:

Cobalt=11.4 wt. %; Zinc=26.7 wt. %.

Example 19

Preparation of a DMC Catalyst Comprising a Glycoside and a Glycidyl Ether (Catalyst XIX):

The same procedure as set forth in Example 1 was used, except that instead of using polyethylene glycol diacrylate and 2-phosphonopropionic acid triethyl ester, an alkyl polyglycoside (GLUCOPON® 650 EC) and polypropylene glycol diglycidyl ether ($M_n$ 640 g/mol) were used as the complexing components.

Yield of dried, pulverulent catalyst: 6.3 g.

Elemental analysis:

Cobalt=10.0 wt. %; Zinc=22.6 wt. %.

Example 20

Preparation of a DMC Catalyst Comprising a Glycoside and a Bile Acid Derivative (Catalyst XX):

The same procedure as set forth in Example 1 was used, except that instead of using polyethylene glycol diacrylate and 2-phosphonopropionic acid triethyl ester, an alkyl polyglycoside (GLUCOPON® 650 EC) and cholic acid sodium salt were used as the complexing components.

Yield of dried, pulverulent catalyst: 4.4 g.

Elemental analysis:

Cobalt 11.6 wt. %; Zinc 27.8 wt. %.

Example 21

Preparation of a DMC Catalyst Comprising a Glycidyl Ether and a Bile Acid Derivative (Catalyst XXI):

The same procedure as set forth in Example 1 was used, except that instead of using polyethylene glycol diacrylate and 2-phosphonopropionic acid triethyl ester, polypropylene glycol diglycidyl ether ($M_n$ 640 g/mol) and cholic acid sodium salt were used as the complexing components.

Yield of dried, pulverulent catalyst: 6.6 g.

Elemental analysis:

Cobalt=9.0 wt. %; Zinc=21.4 wt. %.

Example 22

30 Preparation of a DMC Catalyst Comprising a Phosphorus Compound and an α,β-Unsaturated Carboxylic Acid Ester (Catalyst XXII):

The same procedure as set forth in Example 1 was used, except that instead of using polyethylene glycol diacrylate and 2-phosphonopropionic acid triethyl ester, trimethylolpropane ethoxylate (14/3 EO/OH) triacrylate and 2-phosphonopropionic acid triethyl ester were used as the complexing components.

Yield of dried, pulverulent catalyst: 6.3 g.

Elemental analysis:

Cobalt=9.2 wt. %; Zinc=21.2 wt. %.

Example 23 (Comparison)

Preparation of a DMC Catalyst Comprising Carboxylic Acid of Polyhydric Alcohol (Catalyst XXIII):

A solution of 12.5 g (91.5 mmol) zinc chloride in 20 ml distilled water was added to a solution of 4 g (12 mmol) potassium hexacyanocobaltate in 75 ml distilled water with vigorous stirring (24,000 rpm). Immediately thereafter, a mixture of 50 g tert-butanol and 50 g distilled water was added to the suspension formed and the mixture was then stirred vigorously (24,000 rpm) for 10 min. A mixture of 1 g glycerol tricaproate, 1 g tert-butanol and 100 g distilled water was then added and the mixture was stirred (10,000 rpm) for 3 min. The solid was isolated by filtration, subsequently stirred for 10 min with a mixture of 70 g tert-butanol, 30 g distilled water and 1 g glycerol tricaproate and filtered again. Finally, the solid was stirred (10,000 rpm) again for 10 min with a mixture of 100 g tert-butanol and 0.5 g glycerol tricaproate. After filtration, the catalyst was dried to constant weight at 50° C. under normal pressure.

Yield of dried, pulverulent catalyst: 5.3 g.

Elemental analysis, thermogravimetric analysis and extraction:

Cobalt=12.3 wt. %: Zinc=27.0 wt. %; Tert-butanol=7.2 wt. %; Glycerol tricaproate=3.7 wt. %.

Example 24 (Comparison)

Preparation of a DMC Catalyst Comprising a Phosphorus Compound (Catalyst XXIV):

The same procedure as set forth in Example 23 was used, except that 2-phosphonopropionic acid triethyl ester was used instead of glycerol tricaproate.

Yield of dried, pulverulent catalyst: 5.9 g.

Elemental analysis, thermogravimetric analysis and extraction:

Cobalt=10.2 wt. %; Zinc=23.5 wt. %; Tert-butanol=2.3 wt.%, 2-phosphonopropionic acid triethyl ester=26.1 wt. %.

Example 25 (Comparison)

Preparation of a DMC Catalyst Comprising Glycidyl Ether (catalyst XXV):

The same procedure as set forth in Example 23 was used, except that polypropylene glycol diglycidyl ether having an average molecular weight 640 was used instead of glycerol tricaproate.

Yield of dried, pulverulent catalyst: 6.0 g.

Elemental analysis, thermogravimetric analysis and extraction:

Cobalt=8.7 wt. %; Zinc=20.2 wt. %; Tert-butanol=4.2 wt. %; Polypropylene glycol diglycidyl ether ligand=30.5 wt. %.

Example 26 (Comparison)
Preparation of a DMC Catalyst Comprising Polyester (Catalyst XXVI):

The same procedure as set forth in Example 23 was used, except that a polyester, weakly branched by trimethylolpropane, of adipic acid and diethylene glycol of average molecular weight 2,300 (OH number=50 mg KOH/g) was used instead of glycerol tricaproate.

Yield of dried, pulverulent catalyst: 3.9 g.

Elemental analysis, thermogravimetric analysis and extraction:

Cobalt=12.2 wt. %; Zinc=25.7 wt. %; Tert-butanol=7.1 wt. %; Polyester=12.3 wt. %.

Example 27 (Comparison)
Preparation of a DMC Catalyst Comprising a Bile Acid Derivative (Catalyst XXVII):

The same procedure as set forth in Example 23 was used, except that cholic acid sodium salt was used instead of glycerol tricaproate.

Yield of dried, pulverulent catalyst: 4.2 g.

Elemental analysis, thermogravimetric analysis and extraction:

Cobalt=12.6 wt. %; Zinc=27.3 wt. %; Tert-butanol=10.9 wt. %; Cholic acid sodium salt=4.3 wt. %.

Preparation of Polyether Polyols
General Procedure 50 g polypropylene glycol starter (number-average molecular weight=1,000 g/mol) and 20 mg DMC catalyst (100 ppm, based on the amount of polyether polyol to be prepared) were initially introduced into a 500 ml pressure reactor under an inert gas (argon) and were heated up to 105° C., while stirring. Propylene oxide (approx. 5 g) was then metered in all at once, until the overall pressure had risen to 2.5 bar. Further propylene oxide was only metered in again when an accelerated drop in pressure in the reactor was observed. This accelerated drop in pressure indicated that the DMC catalyst was activated. The remaining propylene oxide (145 g) was then metered in continuously under a constant overall pressure of 2.5 bar. When metering of the propylene oxide was completed and after an after-reaction time of 2 hours at 105° C., volatile contents were distilled off at 90° C. (1 mbar) and the reaction mixture was then cooled to room temperature.

The resulting polyether polyols were characterized by determining the OH numbers, the double-bond contents and the viscosities.

The course of the reaction was monitored with the aid of time/conversion curves (propylene oxide consumption [g] v. reaction time [min]). The induction time was determined from the point of intersection of the tangent at the steepest point of the time/conversion curve with the extended base line of the curve. The propoxylation times, which are decisive for the catalyst activity, correspond to the period of time between activation of the catalyst (end of the induction period) and the end of metering of the propylene oxide. The total reaction time was the sum of the induction and propoxylation time.

Example 28

| Preparation of a polyether polyol with Catalyst I (100 ppm): | |
|---|---|
| Induction time: | 251 min |
| Propoxylation time: | 27 min |
| Total reaction time: | 278 min |
| Polyether polyol: | |
| OH number (mg KOH/g): | 29.2 |
| Double-bond content (mmol/kg): | 7 |
| Viscosity 25° C. (mPas): | 871 |

Example 29

| Preparation of a polyether polyol with Catalyst III (25 ppm): | |
|---|---|
| Induction time: | 126 min |
| Propoxylation time: | 50 min |
| Total reaction time: | 176 min |
| Polyether polyol: | |
| OH number (mg KOH/g): | 29.9 |
| Double-bond content (mmol/kg): | 9 |
| Viscosity 25° C. (mPas): | 878 |

Example 30

| Preparation of a polyether polyol with Catalyst IV (25 ppm): | |
|---|---|
| Induction time: | 163 min |
| Propoxylation time: | 52 min |
| Total reaction time: | 215 min |
| Polyether polyol: | |
| OH number (mg KOH/g): | 30.1 |
| Double-bond content (mmol/kg): | 7 |
| Viscosity 25° C. (mPas): | 821 |

Example 31

| Preparation of a polyether polyol with Catalyst V (100 ppm): | |
|---|---|
| Induction time: | 165 min |
| Propoxylation time: | 10 min |
| Total reaction time: | 175 min |

Example 32

| Preparation of a polyether polyol with Catalyst VI (100 ppm): | |
|---|---|
| Induction time: | 160 min |
| Propoxylation time: | 10 min |
| Total reaction time: | 170 min |

Example 33

| Preparation of a polyether polyol with Catalyst VII (100 ppm): | |
|---|---|
| Induction time: | 240 min |
| Propoxylation time: | 5 min |
| Total reaction time: | 245 min |

Example 34

| Preparation of a polyether polyol with Catalyst VIII (100 ppm): | |
|---|---|
| Induction time: | 165 min |
| Propoxylation time: | 10 min |
| Total reaction time: | 175 min |

Example 35

| Preparation of a polyether polyol with Catalyst IX (100 ppm): | |
|---|---|
| Induction time: | 100 min |
| Propoxylation time: | 10 min |
| Total reaction time: | 110 min |

Example 36

| Preparation of a polyether polyol with Catalyst X (100 ppm): | |
|---|---|
| Induction time: | 150 min |
| Propoxylation time: | 10 min |
| Total reaction time: | 160 min |

Example 37

| Preparation of a polyether polyol with Catalyst XI (100 ppm): | |
|---|---|
| Induction time: | 155 min |
| Propoxylation time: | 10 min |
| Total reaction time: | 165 min |

Example 38

| Preparation of a polyether polyol with Catalyst XII (100 ppm): | |
|---|---|
| Induction time: | 320 min |
| Propoxylation time: | 5 min |
| Total reaction time: | 325 min |

Example 39

| Preparation of a polyether polyol with Catalyst XIII (25 ppm): | |
|---|---|
| Induction time: | 106 min |
| Propoxylation time: | 43 min |
| Total reaction time: | 149 min |
| Polyether polyol: | |
| OH number (mg KOH/g): | 29.3 |
| Double-bond content (mmol/kg): | 6 |
| Viscosity 25° C. (mPas): | 835 |

Example 40

| Preparation of a polyether polyol with Catalyst XIV (100 ppm): | |
|---|---|
| Induction time: | 205 min |
| Propoxylation time: | 5 min |
| Total reaction time: | 210 min |

Example 41

| Preparation of a polyether polyol with Catalyst XV (100 ppm): | |
|---|---|
| Induction time: | 320 min |
| Propoxylation time: | 10 min |
| Total reaction time: | 330 min |

Example 42

| Preparation of a polyether polyol with Catalyst XVI (25 ppm): | |
|---|---|
| Induction time: | 160 min |
| Propoxylation time: | 43 min |
| Total reaction time: | 203 min |
| Polyether polyol: | |
| OH number (mg KOH/g): | 29.5 |
| Double-bond content (mmol/kg): | 8 |
| Viscosity 25° C. (mPas): | 842 |

Example 43

| Preparation of a polyether polyol with Catalyst XVII (100 ppm): | |
|---|---|
| Induction time: | 265 min |
| Propoxylation time: | 5 min |
| Total reaction time: | 270 min |

Example 44

Preparation of a polyether polyol with Catalyst XVIII (100 ppm):

| | |
|---|---|
| Induction time: | 250 min |
| Propoxylation time: | 5 min |
| Total reaction time: | 255 min |

Example 45

Preparation of a polyether polyol with Catalyst XIX (100 ppm):

| | |
|---|---|
| Induction time: | 105 min |
| Propoxylation time: | 10 min |
| Total reaction time: | 115 min |

Example 46

Preparation of a polyether polyol with Catalyst XX (100 ppm):

| | |
|---|---|
| Induction time: | 265 min |
| Propoxylation time: | 5 min |
| Total reaction time: | 270 min |

Example 47

Preparation of a polyether polyol with Catalyst XXI (100 ppm):

| | |
|---|---|
| Induction time: | 135 min |
| Propoxylation time: | 5 min |
| Total reaction time: | 140 min |

Example 48

Preparation of a polyether polyol with Catalyst XXII (100 ppm):

| | |
|---|---|
| Induction time: | 135 min |
| Propoxylation time: | 10 min |
| Total reaction time: | 145 min |

Example 49 (Comparison)

Preparation of a polyether polyol with Catalyst XXIII (100 ppm):

| | |
|---|---|
| Induction time: | 133 min |
| Propoxylation time: | 50 min |
| Total reaction time: | 183 min |
| Polyether polyol: | |
| OH number (mg KOH/g): | 30.0 |
| Double-bond content (mmol/kg): | 6 |
| Viscosity 25° C. (mPas): | 845 |

Example 50 (Comparison)

Preparation of a polyether polyol with Catalyst XXIV (25 ppm):

| | |
|---|---|
| Induction time: | 99 min |
| Propoxylation time: | 110 min |
| Total reaction time: | 209 min |
| Polyether polyol: | |
| OH number (mg KOH/g): | 29.9 |
| Double-bond content (mmol/kg): | 10 |
| Viscosity 25° C. (mPas): | 862 |

Example 51 (Comparison)

Preparation of a polyether polyol with Catalyst XXV (25 ppm):

| | |
|---|---|
| Induction time: | 154 min |
| Propoxylation time: | 37 min |
| Total reaction time: | 191 min |
| Polyether Polyol: | |
| OH number (mg KOH/g): | 30.7 |
| Double-bond content (mmol/kg): | 7 |
| Viscosity 25° C. (mPas): | 809 |

Example 52 (Comparison)

Preparation of a polyether polyol with Catalyst XXVI (25 ppm):

| | |
|---|---|
| Induction time: | 130 min |
| Propoxylation time: | 150 min |
| Total reaction time: | 280 min |
| Polyether polyol: | |
| OH number (mg KOH/g): | 29.5 |
| Double-bond content (mmol/kg): | 5 |
| Viscosity 25° C. (mPas): | 861 |

Example 53 (Comparison)

Preparation of a polyether polyol with Catalyst XXVII (25 ppm):

| | |
|---|---|
| Induction time: | 217 min |
| Propoxylation time: | 33 min |
| Total reaction time: | 250 min |
| Polyether polyol: | |
| OH number (mg KOH/g): | 29.6 |
| Double-bond content (mmol/kg): | 6 |
| Viscosity 25° C. (mPas): | 855 |

What is claimed is:

1. A double-metal cyanide catalyst comprising:
   a) at least one double-metal cyanide compound;
   b) at least one organic complex ligand which is not a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), an oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface or interface-active compound; and c) two different complexing components, each complexing component independently comprising a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), an oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface or interface-active compound.

2. The double-metal cyanide catalyst according to claim 1, further comprising water and/or a water-soluble metal salt.

3. The double-metal cyanide catalyst according to claim 1, wherein the double-metal cyanide compound is zinc hexacyanocobaltate (III).

4. The double-metal cyanide catalyst according to claim 1, wherein the organic complex ligand is an alcohol, aldehyde, keytone, ether, ester, amide, urea, nitrile, sulfide and/or a mixture thereof.

5. The double-metal cyanide catalyst according to claim 1, wherein the organic complex ligand is tert.-butanol.

6. The double-metal cyanide catalyst according to claim 1, wherein the double-metal cyanide catalyst contains up to about 80 wt. %, based on the total weight of the double-metal cyanide catalyst, of a mixture of the complexing components c).

7. A process for preparing a double-metal cyanide catalyst according to claim 1, comprising the steps of:

(a) reacting, in aqueous solution, (i) at least one metal salt, (ii) with at least one metal cyanide salt, in the presence of (iii) an organic complex ligand, which is not a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), an oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface or interface-active compound; and (b) treating the suspension with two different complexing components, each complexing component independently comprising a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylic acid-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), an oxazoline polymer, a polyalkyleneimine, a maleic acid copolymer, a maleic anhydride copolymer, a hydroxyethylcellulose, a polyacetal, a glycidyl ether, a glycoside, a carboxylic acid ester of polyhydric alcohol, a bile acid or bile acid salt, a bile acid ester, a bile acid amide, a cyclodextrin, a phosphorus compound, an α,β-unsaturated carboxylic acid ester, or an ionic surface or interface-active compound.

8. A process according to claim 7, further comprising the steps of:

(c) isolating the catalyst from suspension after (b);

(d) washing the isolated catalyst; and (e) drying the isolated catalyst.

* * * * *